US012162096B1

(12) United States Patent
Curtin

(10) Patent No.: US 12,162,096 B1
(45) Date of Patent: Dec. 10, 2024

(54) SQUEEGEE BLADE HOLDER WITH SECONDARY BLADE MOUNTING APPARATUS

(71) Applicant: Transition Automation, Inc., Tyngsboro, MA (US)

(72) Inventor: Mark J. Curtin, Groton, MA (US)

(73) Assignee: Transition Automation, Inc., Tyngsboro, MA (US)

( * ) Notice: Subject to any disclaimer, the term of this patent is extended or adjusted under 35 U.S.C. 154(b) by 896 days.

(21) Appl. No.: 17/015,583

(22) Filed: Sep. 9, 2020

Related U.S. Application Data

(60) Provisional application No. 62/898,028, filed on Sep. 10, 2019.

(51) Int. Cl.
| | |
|---|---|
| *B23K 3/06* | (2006.01) |
| *B23K 1/00* | (2006.01) |
| *B41F 15/34* | (2006.01) |
| *B41F 15/44* | (2006.01) |
| *B41M 1/12* | (2006.01) |
| *B41M 3/00* | (2006.01) |
| B23K 101/36 | (2006.01) |

(52) U.S. Cl.
CPC .......... *B23K 3/0638* (2013.01); *B23K 1/0016* (2013.01); *B41F 15/34* (2013.01); *B41F 15/44* (2013.01); *B41M 1/12* (2013.01); *B41M 3/006* (2013.01); *B23K 2101/36* (2018.08)

(58) Field of Classification Search
CPC .......... B41F 15/34; B41F 15/44; B41F 15/46; B41M 1/12; B41M 3/006; B23K 3/0638; B23K 1/0016; B23K 2101/36
See application file for complete search history.

(56) References Cited

U.S. PATENT DOCUMENTS

| | | | |
|---|---|---|---|
| 2,359,408 A | 10/1944 | Disse | |
| 2,783,709 A | 3/1957 | Thomas | |
| 2,863,382 A | 12/1958 | Giani | |
| 3,071,069 A | 1/1963 | Sherman | |
| 3,377,644 A | 4/1968 | Budzinski et al. | |
| 3,505,951 A | 4/1970 | Gartrell | |

(Continued)

FOREIGN PATENT DOCUMENTS

| | | |
|---|---|---|
| EP | 0003379 A1 | 8/1979 |
| GB | 2172542 A | 9/1986 |

(Continued)

OTHER PUBLICATIONS

Magna-Print™ Universal Squeegee Blade System, retrieved from the Internet at www.ben-technologies.com/support/wp-content/download/magna_datasheet.pdf, on Mar. 27, 2023, 2 pages.

(Continued)

*Primary Examiner* — Jennifer Bahls
*Assistant Examiner* — Quang X Nguyen
(74) *Attorney, Agent, or Firm* — Gesmer Updegrove LLP

(57) ABSTRACT

A squeegee assembly is disclosed for use in a solder paste printing system. The squeegee assembly includes an elongated primary blade holder holding a primary blade adapted for movement in a first direction, and one or more secondary blades mounted to the primary blade holder in a following position with respect to the first direction of movement of the primary blade.

16 Claims, 12 Drawing Sheets

(56) References Cited

U.S. PATENT DOCUMENTS

| | | |
|---|---|---|
| 3,619,478 A | 11/1971 | Staiger |
| 3,670,409 A | 6/1972 | Reimer |
| 3,899,379 A | 8/1975 | Wanesky |
| 4,023,486 A | 5/1977 | Linthicum et al. |
| 4,146,484 A | 3/1979 | Campbell |
| 4,248,150 A | 2/1981 | Lala |
| 4,254,707 A | 3/1981 | Lambert et al. |
| 4,273,655 A | 6/1981 | Reid |
| 4,404,903 A | 9/1983 | Cronin |
| 4,433,623 A | 2/1984 | Beckim et al. |
| 4,485,736 A | 12/1984 | Strutz, Jr. et al. |
| 4,498,988 A | 2/1985 | Fujita et al. |
| 4,729,306 A | 3/1988 | Bubley |
| 4,759,488 A | 7/1988 | Robinson et al. |
| 4,768,286 A | 9/1988 | Ketcham |
| 4,778,641 A | 10/1988 | Chia |
| 4,810,616 A | 3/1989 | Grabbe et al. |
| 4,818,724 A | 4/1989 | Cetronio et al. |
| 4,859,188 A | 8/1989 | Neumann |
| 4,950,173 A | 8/1990 | Minemura et al. |
| 4,961,893 A | 10/1990 | Rose |
| 4,993,199 A | 2/1991 | Hughes |
| 5,037,599 A | 8/1991 | Olson |
| 5,044,306 A | 9/1991 | Erdmann |
| 5,045,914 A | 9/1991 | Casto et al. |
| 5,054,193 A | 10/1991 | Ohms et al. |
| 5,091,769 A | 2/1992 | Eichelberger |
| 5,095,925 A | 3/1992 | Elledge et al. |
| 5,106,784 A | 4/1992 | Bednarz et al. |
| 5,107,876 A | 4/1992 | Ozyjiwsky et al. |
| 5,123,985 A | 6/1992 | Evans et al. |
| 5,143,102 A | 9/1992 | Blaul |
| 5,164,335 A | 11/1992 | Sato et al. |
| 5,166,184 A | 11/1992 | Hashimoto et al. |
| 5,216,278 A | 6/1993 | Lin et al. |
| 5,218,759 A | 6/1993 | Juskey et al. |
| 5,271,325 A | 12/1993 | Price et al. |
| 5,301,701 A | 4/1994 | Nafziger |
| 5,303,820 A | 4/1994 | Comtois |
| 5,303,824 A | 4/1994 | Kohn |
| 5,320,226 A | 6/1994 | Merrill |
| 5,345,862 A | 9/1994 | Giard |
| 5,353,498 A | 10/1994 | Fillion et al. |
| 5,354,714 A | 10/1994 | Boysel et al. |
| 5,458,060 A | 10/1995 | Casl |
| 5,461,781 A | 10/1995 | Pirc et al. |
| 5,550,622 A | 8/1996 | Tange |
| 5,576,030 A | 11/1996 | Hooper |
| 5,578,158 A | 11/1996 | Gutowski et al. |
| 5,611,274 A | 3/1997 | Tani |
| 5,632,200 A | 5/1997 | Fukai |
| 5,649,479 A | 7/1997 | Hoffman |
| 5,660,632 A | 8/1997 | Volpe, Jr. et al. |
| 5,704,381 A | 1/1998 | Millan et al. |
| 5,802,970 A | 9/1998 | Tani |
| 5,887,312 A | 3/1999 | Curtin |
| 5,893,325 A | 4/1999 | Sakai |
| 6,022,192 A | 2/2000 | DaLaHoz et al. |
| 6,237,484 B1 | 5/2001 | Homma et al. |
| 6,267,818 B1 * | 7/2001 | Volpe, Jr. ............... B41F 15/44 |
| | | 118/103 |
| 6,397,741 B1 | 6/2002 | Curtin |
| 6,585,943 B1 | 7/2003 | Sanford et al. |
| 6,640,712 B2 | 11/2003 | Corti et al. |
| 6,659,002 B2 | 12/2003 | Langdon et al. |
| 6,698,346 B2 | 3/2004 | Shimizu et al. |
| 7,017,489 B2 | 3/2006 | Perault et al. |
| 7,614,342 B2 | 11/2009 | Curtin et al. |
| 7,905,239 B2 | 3/2011 | Kim |
| 8,225,804 B2 | 7/2012 | Publ |
| 8,281,735 B2 | 10/2012 | Curtin |
| 2002/0170579 A1 | 11/2002 | Lammert et al. |
| 2004/0026444 A1 | 2/2004 | DeSilva et al. |
| 2007/0062386 A1 | 3/2007 | Curtin et al. |
| 2007/0199578 A1 | 8/2007 | Nomura et al. |
| 2008/0072927 A1 | 3/2008 | Weiss |
| 2009/0133721 A1 | 5/2009 | Campbell |
| 2009/0158943 A1 * | 6/2009 | Kobayashi ............ B41F 15/46 |
| | | 101/129 |
| 2009/0217830 A1 | 9/2009 | Eppinger |

FOREIGN PATENT DOCUMENTS

| | | |
|---|---|---|
| JP | 01212492 A | 8/1989 |
| JP | 11198347 A | 7/1999 |
| JP | 2006281786 A | 10/2006 |
| NL | 7800707 A | 7/1979 |

OTHER PUBLICATIONS

IBM Technical Disclosure Bulletin, Coated Wafer Carriers, vol. 27, No. 10A, Mar. 1985, 2 pages.
IBM Technical Disclosure Bulletin, Card Holder and Lock, vol. 29, No. 1, Jun. 1986, pp. 182-184, 4 pages.
IBM Technical Disclosure Bulletin, Mask Assembly and Wafer Tray, vol. 29, No. 2, Jul. 1986, 2 pages.
IBM Technical Disclosure Bulletin, Multi-Purpose Tote and Insertion System for Generic Material Handling, vol. 31, No. 6, Nov. 1988, pp. 314-315, 3 pages.
IBM Technical Disclosure Bulletin, Standoff Attach Tool, vol. 32, No. 4A, Sep. 1989, pp. 72-73 3 pages.
IBM Technical Disclosure Bulletin, Multiple Substrate Package, vol. 35, No. 4A, Sep. 1992, pp. 264-265, 3 pages.
Non-Final Office Action issued by the United States Patent and Trademark Office in related U.S. Appl. No. 16/932,147 on Nov. 2, 2023, 15 pages.
Final Office Action issued by the United States Patent and Trademark Office in related U.S. Appl. No. 16/392,147 on Mar. 22, 2024, 12 pages.

* cited by examiner

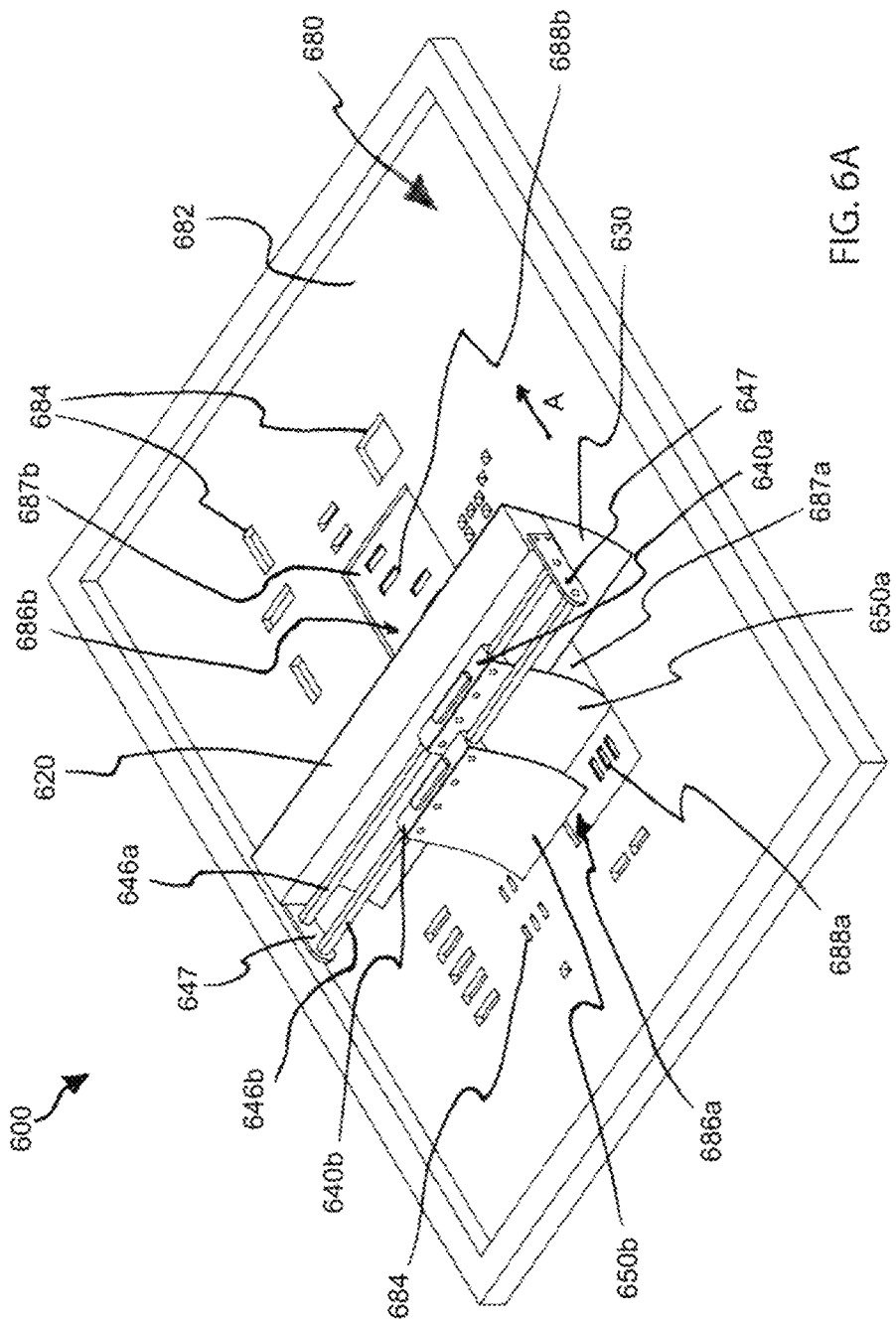

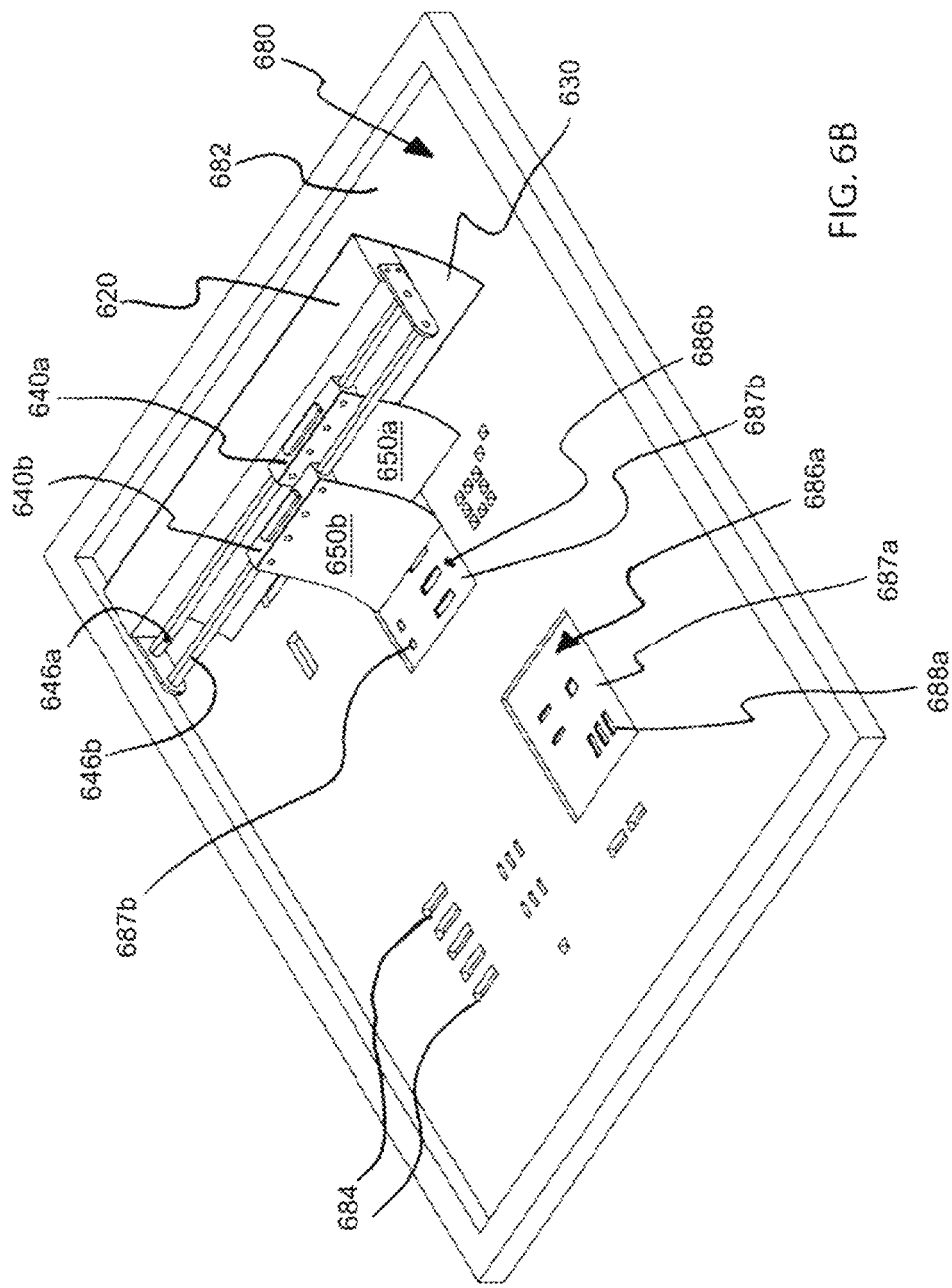

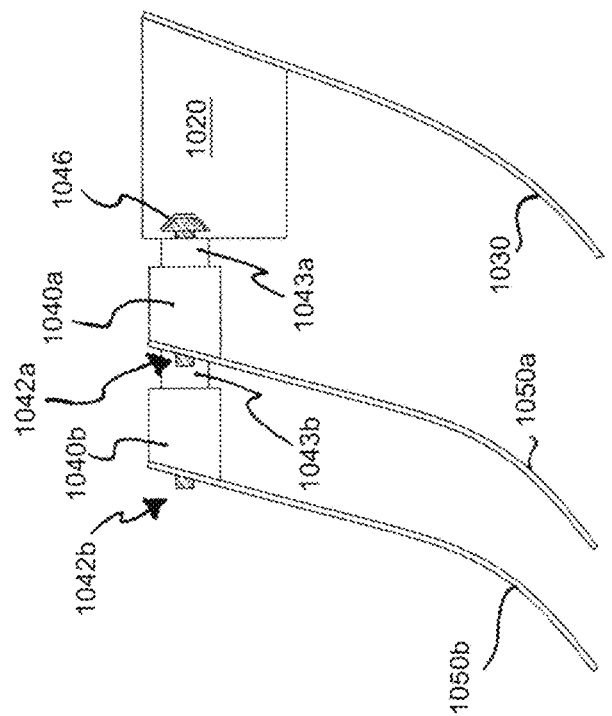
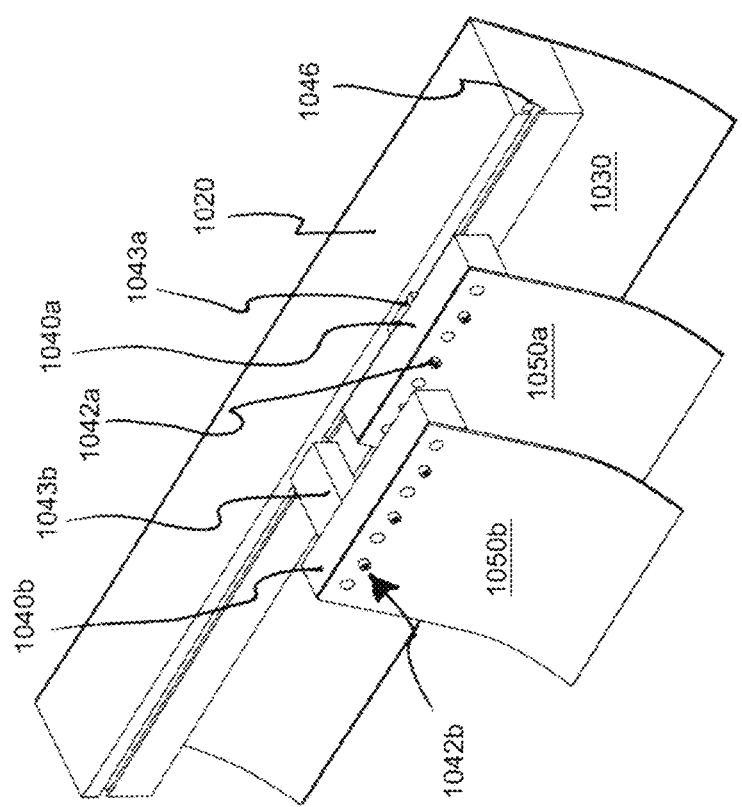
FIG. 10B
FIG. 10A

SQUEEGEE BLADE HOLDER WITH SECONDARY BLADE MOUNTING APPARATUS

PRIORITY

The present application claims priority to U.S. Provisional Patent Application Ser. No. 62/898,028 filed Sep. 10, 2019, the disclosure of which is hereby incorporated by reference in its entirety.

BACKGROUND

The invention generally relates to squeegee blade holders, and relates in particular to squeegee blade holders for use in multi-level stencil solder paste printing.

Modern electronics manufacturing typically involves, in part, the application of solder paste to an electronics assembly, such as a printed circuit board, in a process referred to as solder paste printing. Solder paste printing generally involves a solder paste printing system that uses a squeegee assembly that cooperates with a stencil mask to deposit solder paste onto an electronics assembly in a predefined pattern. During a squeegee stroke, a blade held in the squeegee assembly pushes solder paste along the stencil mask. This causes the solder paste to form a somewhat cylindrical shape that rolls across the stencil surface, filling stencil apertures in the process. Once the stencil mask is removed, the solder paste should be adhered to the electronics assembly in the desired pattern.

The stencil apertures are etched or machined through the thickness of the stencil mask to define the pattern of solder paste to be printed. In some cases, varying thickness of print deposits is desired. To accomplish this stencil manufacturers will supply multi-level stencils. The multi-level stencils have apertures going through the full thickness of the stencil, and apertures in lower, stepped-down areas having apertures extending through the reduced-thickness. As seen in FIG. 1, a typical solder paste printing system 100 has a squeegee assembly 110 with blade holder 120 holding blade 130. The squeegee assembly 110 is positioned over a foil stencil mask 180 that has full-height apertures 184 extending from a topmost surface 182 of the stencil 180 through its full thickness, and a stepped-down area 186 having reduced-height apertures 188 extending from a top surface 187 of the stepped-down area 186 through the stepped area's reduced thickness. The squeegee assembly 110 is moved in a direction A across the stencil 180 to push solder paste through the stencil 180 and onto an electronics assembly workpiece 190, such as a printed circuit board. The full-height apertures 184 and reduced-height apertures 188 correspond with solder pad locations 194 on the workpiece 190. The solder pad locations 194 are typically connected to other areas of the workpiece 190 through conductive traces 196.

Ideally, the full-height and reduced-height apertures will be filled and leveled off by the system, producing solder paste pads that mirror the volumetric geometry of the stencil apertures. In some cases, however, the solder paste pads can come out with compromised geometries, such as having too little solder paste caused by improper filling or adhesion to the stencil during removal, or too much paste between the stencil and the electronics assembly caused by excessive deposition pressure or voids between the stencil and the electronics assembly 190.

Optimal solder paste pad characteristics rely heavily on the characteristics of the blade, or squeegee, used to press solder paste into the apertures. For proper deposition, the correct angle of attack and blade speed is dialed in to produce desired rheological properties in the solder paste for effective filling of and release from the stencil.

The squeegee blade can be made of a stiff material, such as stainless steel, carbon fiber, or other stiff material or composite. Multi-level stencils present a problem for metal squeegees due to the fact that metal squeegees do not flex at a steep gradient. The stiffness causes the blade to fill the entire stepped area, while potentially not filling the reduced-height apertures due to a decrease in pressure as stress is relieved from the solder paste, thicken the paste and decreasing its flow characteristics.

As an alternative, end-users will often use a more flexible blade, such as one made by polyurethane, rubber, or other polymer, which conform into the multi-level stencil better. However, these compliant blades do not print as consistently as metal squeegees, producing a "scooped" aperture fill profile in both full- and reduced-height apertures. The compliant blades also wear out faster, with reduced durability and more intense aperture edge interactions when compared to stiffer blades such as those made of metal.

Solder printers may also employ a blade that is slotted along its length to provide localized flexibility with a stiffer, more durable blade material. If the slots are lined up closely with the lower level stencil areas, this can provide some leveling-off capabilities of metal blades, while being able to reach into the stepped-down areas. However, often the slots do not adequately line up with the step-down areas causing the blade to deposit the solder paste inconsistently in and around the step-down areas. Furthermore, the slotted solution often leaves streaks of solder paste along the stencil that can build up over time and cause printing and durability issues. The geometry of the slotted blades also need to be optimized only for the full-height apertures or for the reduced-height apertures, as the blade angle will be different for both based on different blade contact angles as the blade bends to accommodate the different heights. These issues all produce inconsistent solder paste coverage, dirty stencils, and print errors.

No prior solution can provide optimal print characteristics for both full-height and reduced height apertures. Therefore a need exists for a solution that can provide optimized blade characteristics for both full- and reduced height apertures.

SUMMARY

In accordance with an aspect, the invention provides a squeegee assembly for use in a solder paste printing system. The squeegee assembly includes an elongated primary blade holder holding a primary blade adapted for movement in a first direction, and one or more secondary blades mounted to the primary blade holder in a following position with respect to the first direction of movement of the primary blade.

In accordance with another aspect, the invention provides a solder paste printing system for depositing solder paste to an electronics assembly. The system includes a multi-layer solder mask stencil having a top surface and one or more stepped-down areas having a reduced-height surface below the top surface, the stencil defining a first set of apertures extending through the stencil from the top surface, and a second set of apertures extending through the stencil from the reduced-height surface, and a squeegee assembly having an elongated primary blade holder holding a primary blade, and one or more secondary blades mounted to the primary blade holder, the squeegee assembly being movable in a first direction along the stencil. The primary blade is configured to scrape against the top surface of the stencil to provide the first set of apertures with solder paste that is level with the top surface of the stencil, and the one or more secondary blades is configured to scrape against the reduced-height surface of the stencil to provide the second set of apertures with solder paste that is level with the reduced-height surface.

In accordance with a further aspect, the invention provides a method of depositing solder paste to an electronics assembly. The method includes: providing a multi-layered solder mask having a first set of apertures at first height and a second set of apertures at a second height that is below the first height, and pushing solder paste across the solder mask with a squeegee assembly to fill the apertures, the squeegee assembly having a primary blade for leveling off the first set of apertures at the first height, and a secondary blade for leveling off the second set of apertures at the second height.

BRIEF DESCRIPTION OF THE DRAWINGS

The following description may be further understood with reference to the accompanying drawings in which:

FIGS. 6A and 6B show illustrative diagrammatic views of a solder paste printing system in accordance with another aspect of the present invention including a plurality of overlapping secondary blades, during stenciling of a first stepped area (FIG. 6A), and during stenciling of a second stepped area (FIG. 6B);

FIGS. 10A and 10B show illustrative diagrammatic views of a squeegee assembly isometric (FIG. 10A) and side views (FIG. 10B) in accordance with an aspect of the present invention including a plurality of secondary blade holders with a linear slot assembly.

The drawings are shown for illustrative purposes only.

DETAILED DESCRIPTION

In accordance with an aspect, the invention provides a solder paste printing system utilizing multiple blades that are configured to provide optimal print characteristics for multi-level solder mask stencils. In accordance with another aspect, the invention provides in a solder paste printing system a squeegee assembly having a primary blade configured to fully fill and clear full-height apertures, and one or more secondary blades that can be positioned to travel into a stepped area to effectively deposit solder paste into reduced-height apertures to fully fill and clear the reduced-height apertures.

In accordance with certain aspects of the invention, the squeegee assembly includes a primary squeegee blade and one or more secondary "mini" squeegee blades that are sized to fit into any step-down regions that exist on a provided multi-level stencil. The secondary blades are positioned to match the location of the step-down areas and be sized to fit into them with close tolerance to provide effective wiping in these regions. The secondary blades can be repositioned and replaced with squeegees of varying widths to accommodate different print jobs as needed. Because blade speed and solder paste properties are the same for the main and secondary blades, the secondary blade geometry and stencil contact characteristics are altered from that of the main blade to produce optimal filling properties.

Figure 1:
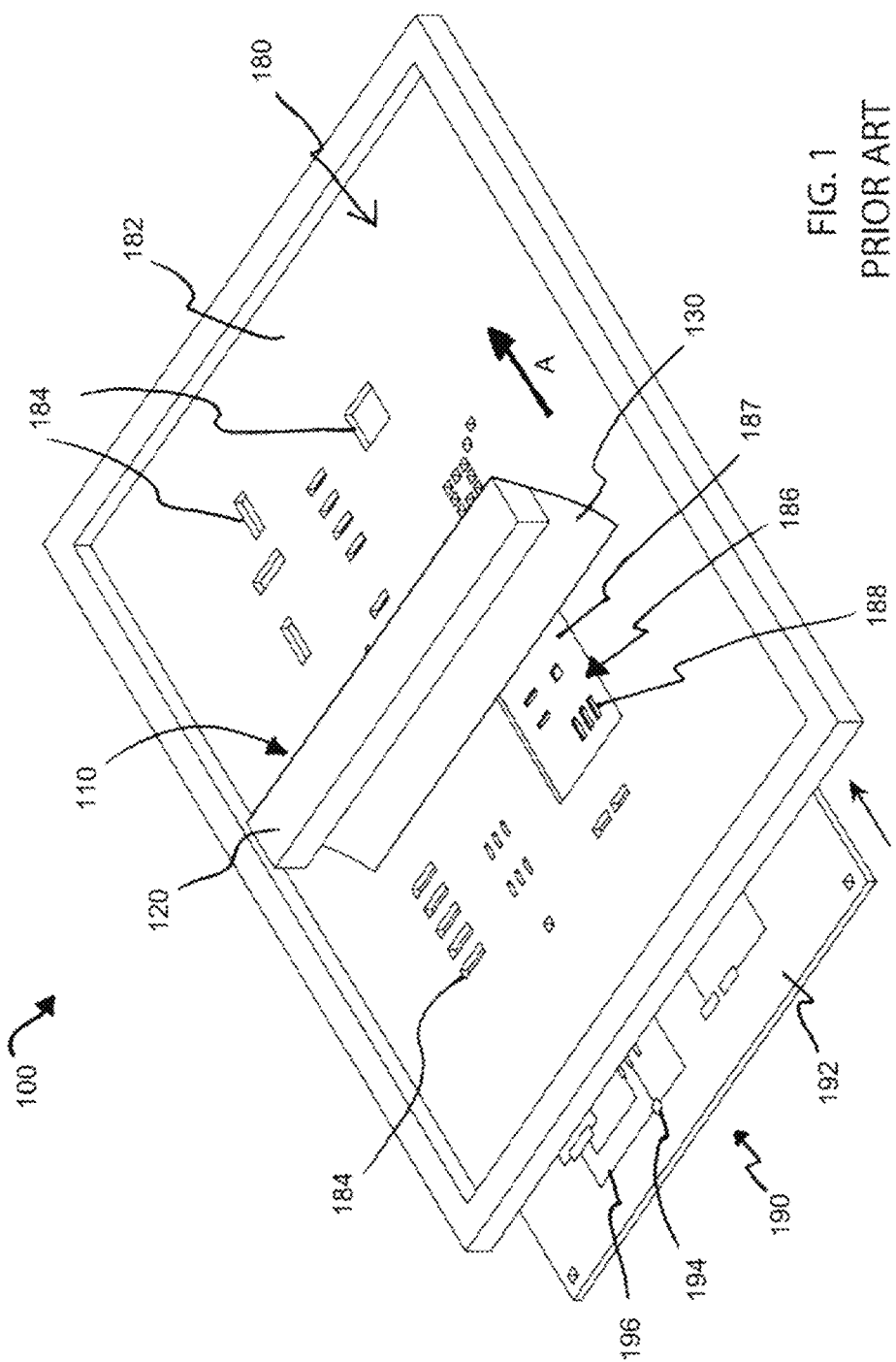
FIG. 1 shows an illustrative diagrammatic view of a solder paste printing system in accordance with the prior art.
Figure 2:
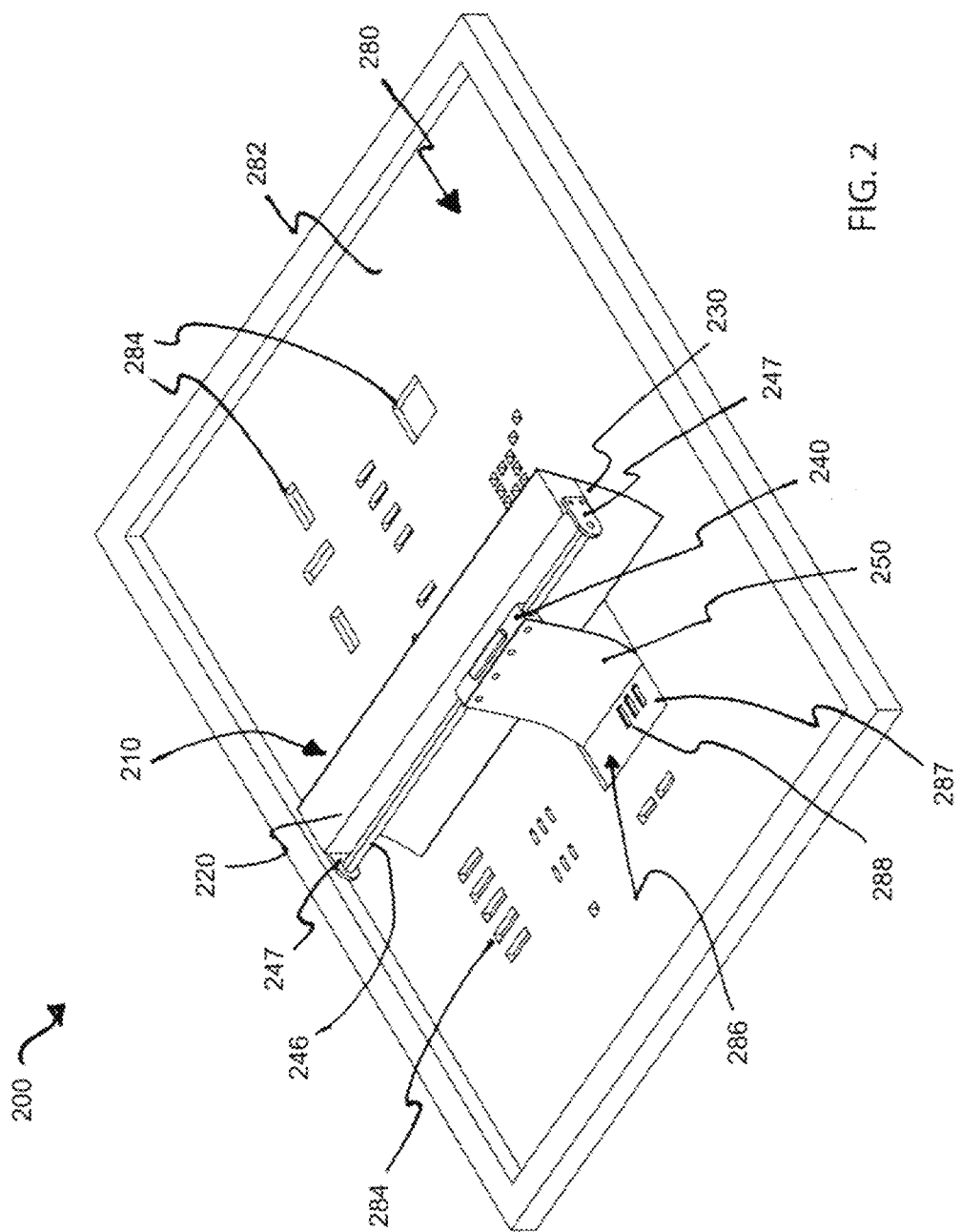
FIG. 2 shows an illustrative diagrammatic view of a solder paste printing system in accordance with an aspect of the present invention.

With reference to FIG. 2, a solder paste printing system 200 has a squeegee assembly 210 with primary blade holder 220 holding primary blade 230. The squeegee assembly 210 further includes a secondary blade holder 240 slidably mounted on a linear mounting element 246, the secondary blade holder 240 holding secondary blade 250. In some embodiments, the linear mounting element 246 is a linear rod or bar attached to the primary blade holder 220 by mounts 247. The squeegee assembly 210 is positioned over a solder mask, or stencil, 280 that has full-height apertures 284 extending from a topmost surface 282 of the stencil 280 through its full thickness, and a stepped-down area 286 having reduced-height apertures 288 extending from a top surface 287 of the stepped-down area 286 through the stepped area's reduced thickness. As with a typical solder paste printing system, the squeegee assembly 210 is moved across the stencil 280 to push solder paste through the stencil 280 and onto an electronics assembly workpiece 190 (such as that shown in FIG. 1).

Figure 3:
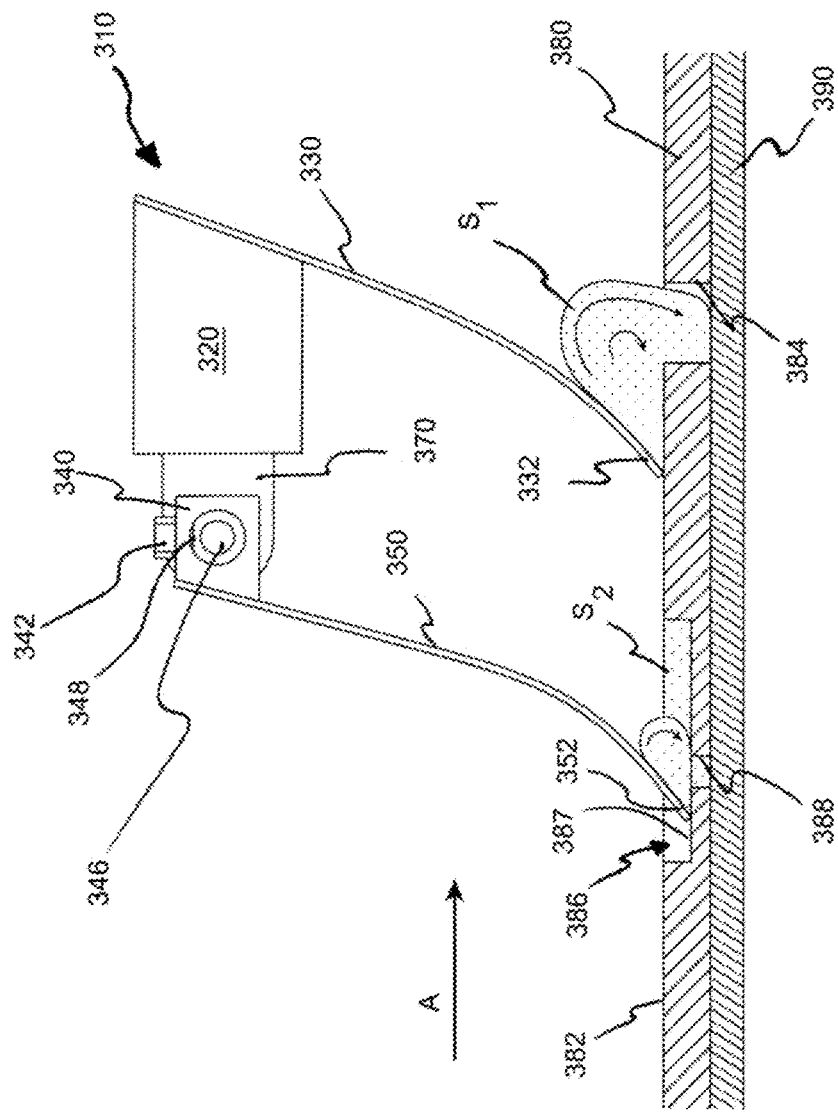
FIG. 3 shows an illustrative diagrammatic side view of a blade assembly of the system of FIG. 2.

The secondary blade is shaped to fit within the stepped area with close tolerances to enter the stepped area and scrape solder paste from the top surface thereof. As shown in FIG. 3, as the blade assembly 310 is moved in a direction A across the stencil, the primary blade 330 pushes a primary solder paste mass $S_1$ that rolls along the top surface 382 of the stencil 380. As the primary solder paste mass $S_1$ rolls, it fills both the stepped-down areas 386 and full-height apertures 384. Primary blade 330 is provided with a desired geometry and held by primary blade holder 320 such that a scraping edge 332 of the primary blade 330 contacts the primary solder paste mass $S_1$ and the top surface 382 of stencil 380 to create the desired flow and filling properties in the solder paste mass $S_1$ to fill the full-height apertures 384. Some of the solder paste mass $S_1$ is deposited in the stepped areas 386 creating a secondary solder paste mass $S_2$. Secondary blade 350 is provided with a desired geometry and held by secondary blade holder 340 such that a scraping edge 352 of the primary blade 350 contacts the secondary solder paste mass $S_2$ and top surface 387 of stepped area 386 to create the desired flow and filling properties in the solder paste mass $S_1$ to fill the reduced-height apertures 388. The secondary blade holder 340 is mounted on linear element 346 to prevent rotation of the secondary blade 350. In some embodiments, rotation is prevented by the selectable engagement of a retention element 342, such as a set screw or spring-biased surface, which engages a flat 348 on the linear element 346. In addition to preventing rotation of the secondary blade holder 340, this retention element 342 also retains the secondary blade 350 in a longitudinal direction to maintain alignment of secondary blade 350 with the stepped area 386 as it is drawn across the stencil 380.

Figure 4A:
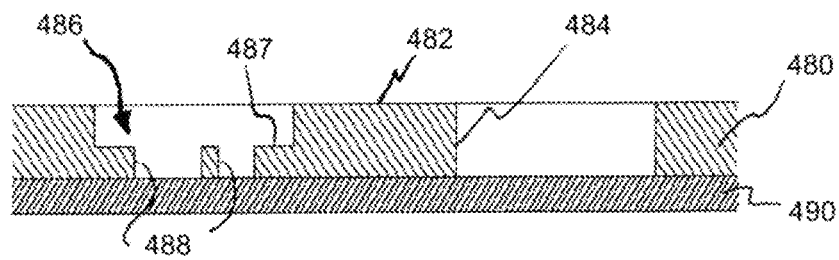
FIGS. 4A-4D show illustrative diagrammatic views of a multi-level stencil (FIG. 4A), being filled using a single flexible blade (FIG. 4B), being filled using a single rigid blade (FIG. 4C), and being filled using a blade assembly in accordance with an aspect of the invention (FIG. 4D)
Figure 4B:
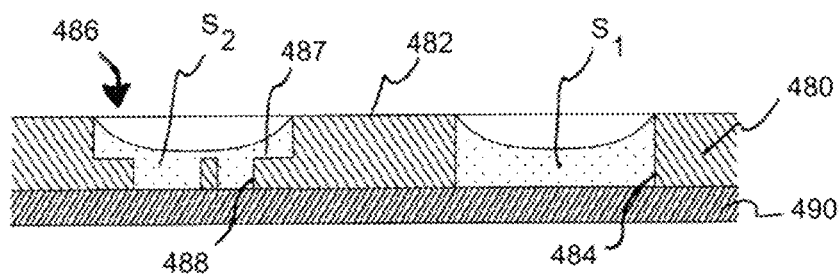
Figure 4C:
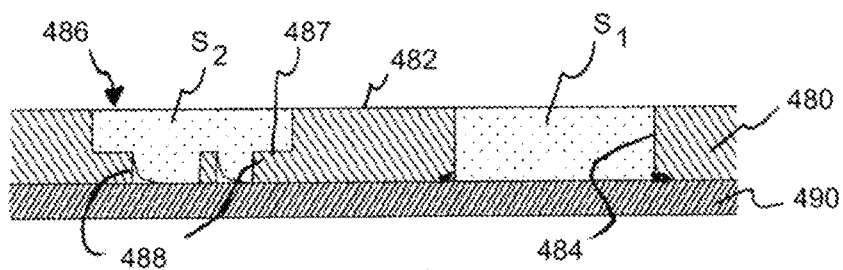

Because the aperture filling characteristics presented to the primary blade 330 and secondary blades 350 are different—for example the aperture fill heights, the scraping surface heights, and the mass of solder paste engaged—the design of the blades must also be different to provide optimal filling characteristics. FIG. 4A provides an illustrative view of a multi-level stencil 480 placed over an electronics assembly 490. The stencil 480 has both with full-height apertures 484 extending from a top surface 482 thereof, and reduced-height apertures 488 extending from the top surface 487 of stepped area 486. If a single blade is used, various print issues arise. FIG. 4B illustrates solder paste profiles $S_1$ and $S_2$ produced when a single flexible blades is used to fill the multi-level stencil 480. In this scenario, the soft blade dips below the top surface 482 of the stencil 480 to remove solder paste above the reduced-height apertures 488. However, complete scraping is not accomplished in the stepped area 486 as the blade is generally not able to contact surface 487. This can cause issues when the stencil is removed, with solder paste sticking to the stencil and causing issues such as dog ears where paste is pulled upwards and then fold over onto itself as it releases from the stencil. This unwanted geometry can cause the solder paste to flow into undesired areas when heated, potentially shorting out or otherwise impacting the electronics assembly if the resultant solder flows across multiple conductive traces or pads, for example. Furthermore, the soft blade reduces the height of the solder paste in full-height aperture 484, causing potential adhesion issues for applied components. FIG. 4C illustrates issues arising from using a single rigid blade to scrape both full- and reduced height apertures. In this case, the secondary solder paste mass $S_2$ has even more volume to produce unwanted geometries in a resultant solder paste pad, and pressure drops in the stepped area as the solder paste flows off surface 487 may cause voids in reduced-height apertures 488. Increasing the pressure to force solder into those voids may cause solder paste $S_1$ to be forced out of full-height apertures 484 and between the stencil 480 and electronics assembly 490. This can also cause shorting or other problems on the electronics assembly 490.

Figure 4D:
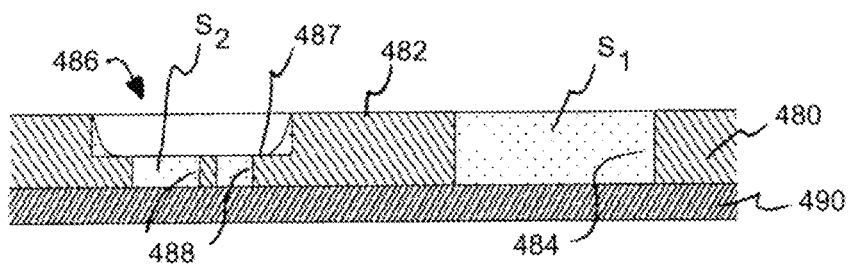

FIG. 4D illustrates the use of a multi-blade system according to various embodiments of the invention. A primary blade can be configured to fully fill and level-off a full-height aperture 484 with solder paste $S_1$, while a secondary blade can enter the stepped area 486 and scrape across the surface 487 to fully fill and level-off reduced-height apertures 488 with solder paste $S_2$. Each of the apertures 484/486 can then be filled as designed for accurate desired solder pad production.

Figure 5A:
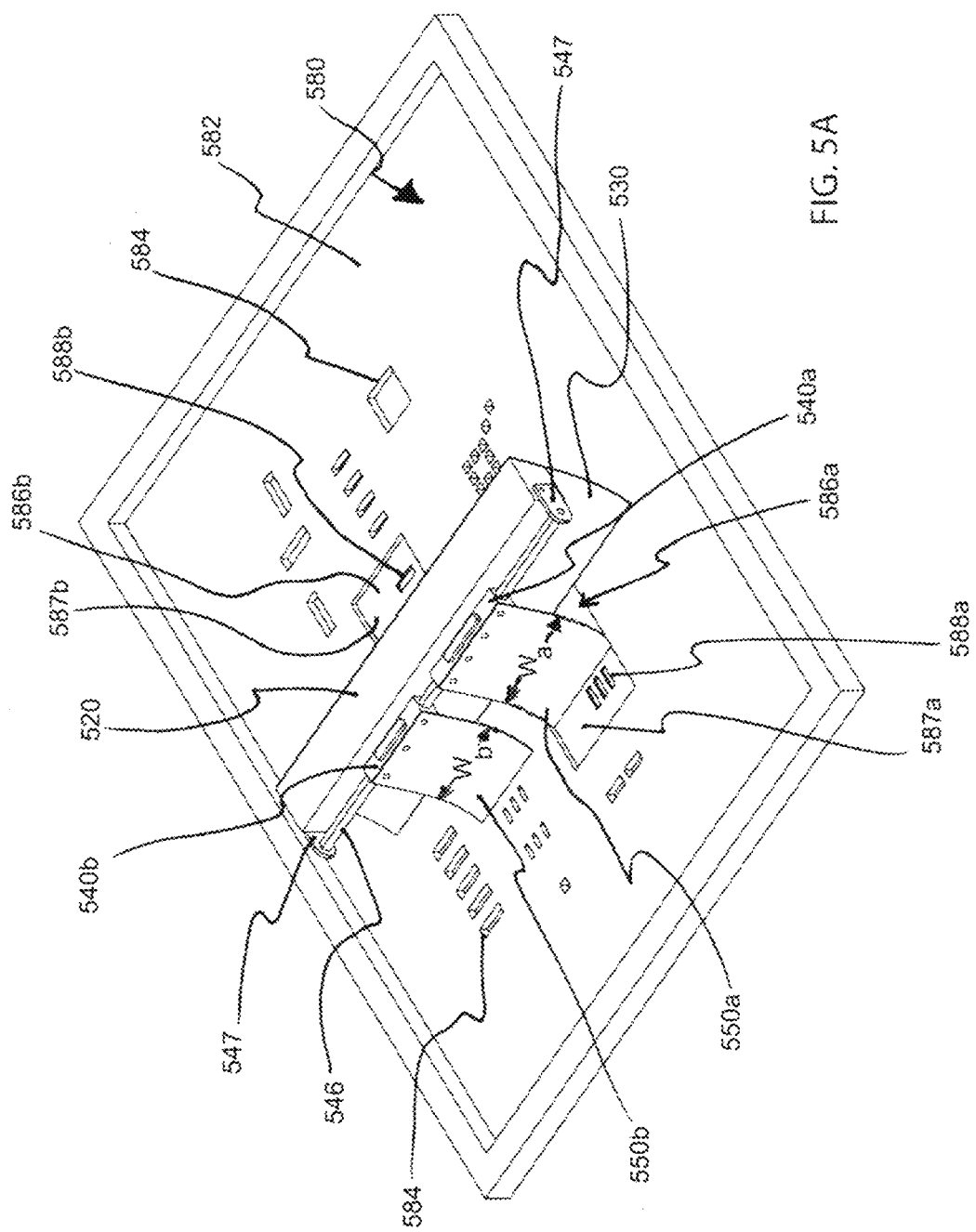
FIGS. 5A and 5B show illustrative diagrammatic views of a solder paste printing system in accordance with another aspect of the present invention including a plurality of secondary blades, during stenciling of a first stepped area (FIG. 5A), and during stenciling of a second stepped area (FIG. 5B)
Figure 5B:
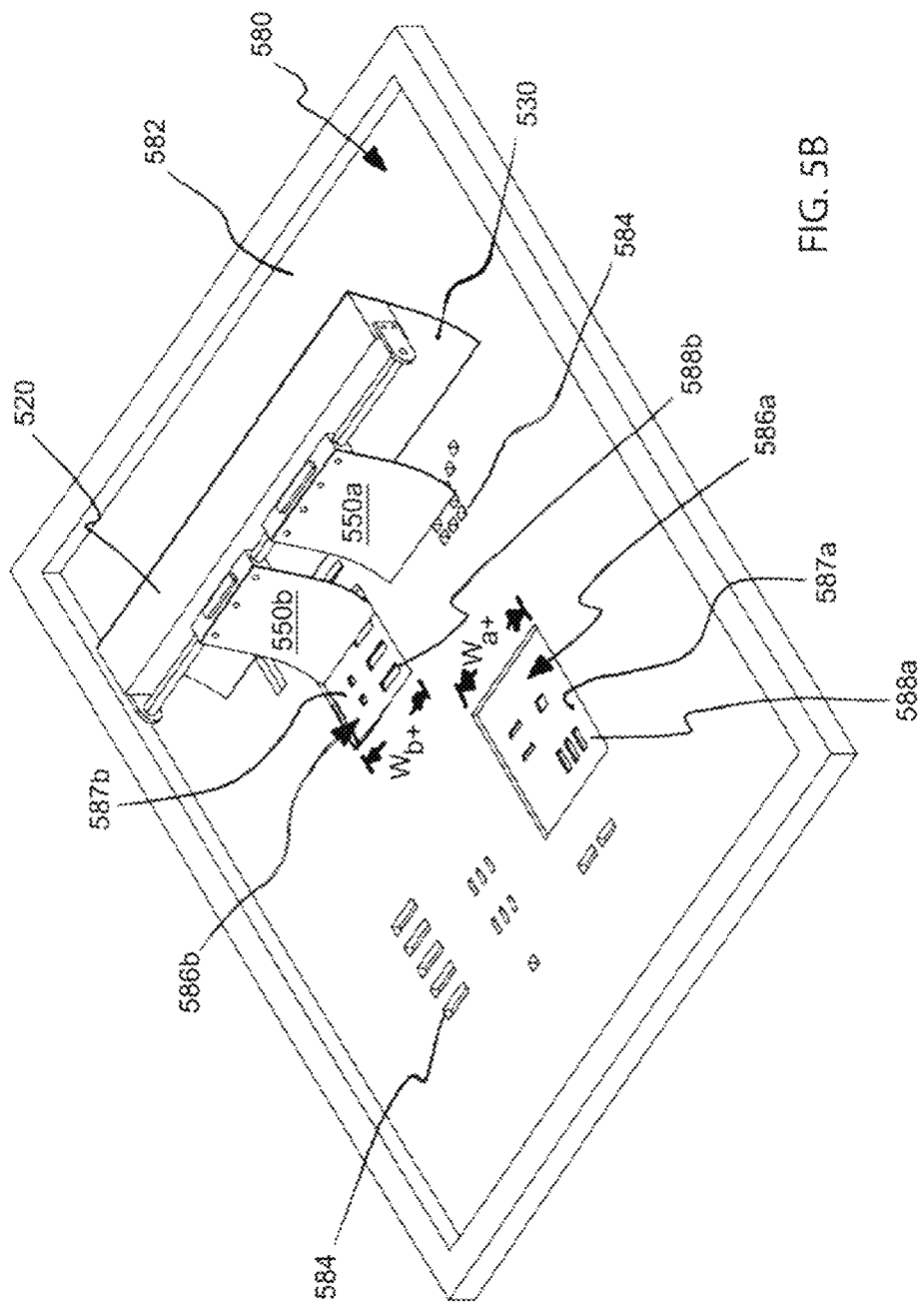

In some instances, multiple stepped-down areas may be present on a multi-level stencil, necessitating multiple secondary blades. In FIGS. 5A and 5B, solder paste printing system 500 includes a multi-level stencil 580 having first and second stepped areas 586a/586b. Primary blade holder 520 moves primary blade 530 across top surface 582 of the stencil 580, filling full-height apertures 584 and stepped areas 586a/586b. Mounting elements 547 attach linear element 546 to the primary blade holder 520. Secondary blade holders 540a/540b are slidably mounted on linear element 546 to position their respective secondary blades 550a/550b in line with their associated stepped areas 586a/586b. The widths $w_a$ and $w_b$ of the secondary blades 550a/550b are chosen to slightly narrower than the widths $w_{a+}$ and $w_{b+}$ of the respective stepped areas so that the blade edges can contact the surface 587a/587b of the stepped areas to fill and level-off the reduced-height apertures 588a/588b. Because the primary blade 530 has already filled and leveled-off the full-height apertures 584 by the time the secondary blades travel thereacross, the secondary blades 550a/55b do not significantly interact or interfere with the solder paste already deposited therein.

In some cases, a multi-level stencil may present stepped areas that overlap along a scraping direction. In this scenario, secondary blades must also overlap to register with their respective stepped areas. FIGS. 6A and 6B show an embodiment of the invention where a solder paste printing system 600 is set up with first and second secondary blade holders 640a and 640b mounted on first and second linear elements 646a and 646b, respectively. Both the first and second linear elements 646a/646b are mounted to the primary blade holder 620 by mounting elements 647. This arrangement allows secondary blades 650a and 650b to overlap. As the primary blade holder 620 is moved in a direction A, the primary blade 630 travels over the top surface 682 of the stencil 680 to deposit solder paste into full-height apertures 684. First secondary blade follows behind the primary blade 630 and enters the first stepped area 686a to which it is aligned and shaped to enter. As the first secondary blade contacts and moves along the surface 687a of the first stepped area 686a to fill the first reduced-height apertures 688a, the second secondary blade maintains contact with the top surface 682, and can travel over stepped area 686a without entering it. Similarly, as seen in FIG. 6B, first secondary blade 650a travels over second stepped area 686b as second blade 650b contacts and moves along the surface 687b of the second stepped area 686b to fill second reduced-height apertures 688b.

Figure 7B:
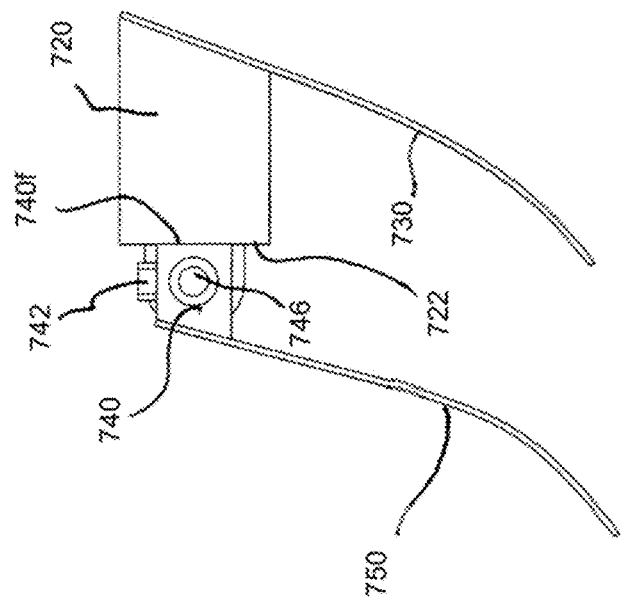
FIGS. 7A and 7B show illustrative diagrammatic views of a squeegee assembly isometric (FIG. 7A) and side views (FIG. 7B) in accordance with an aspect of the present invention including a secondary blade holder with a linear rod element.
Figure 7A:
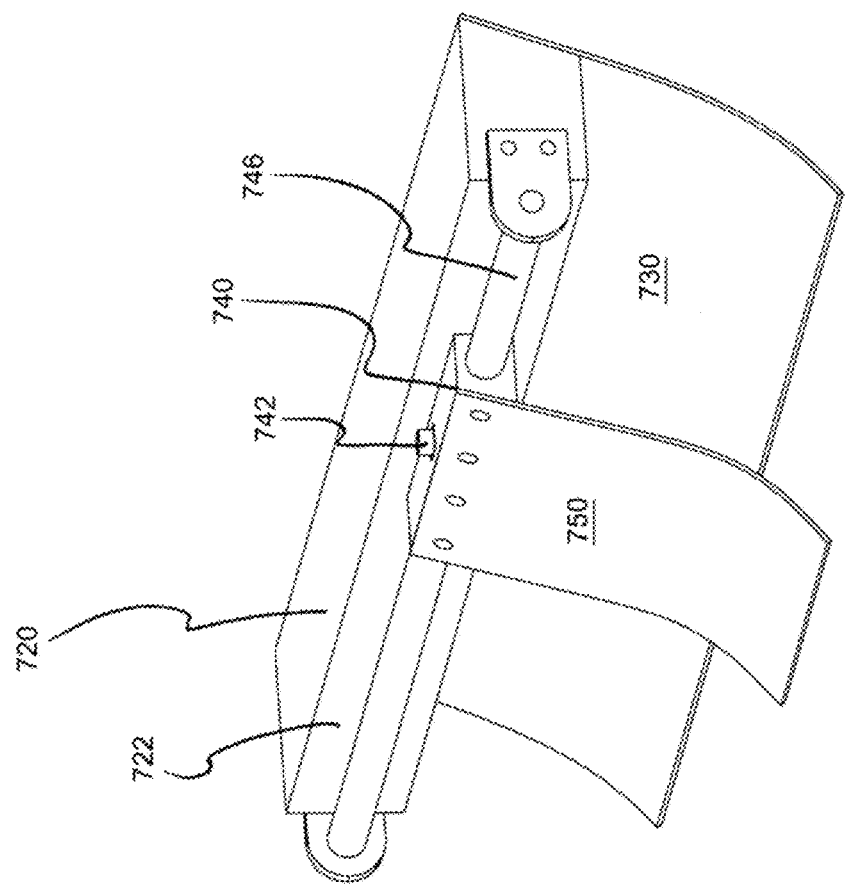

The secondary blade holders can be attached to the primary blade holder in a variety of ways. FIGS. 7A and 7B show an embodiment of the invention where secondary blade holder 740 is slidably mounted on a linear element 746. A retaining member 742 is used to secure the secondary blade holder along the length of the linear element 746, while a surface 740f of the secondary blade holder contacts a face 722 of the primary blade holder 720 to prevent the secondary blade holder 740 from rotating about the central axis of linear element 746 as blade 750 applies a moment force thereto.

Figure 8B:
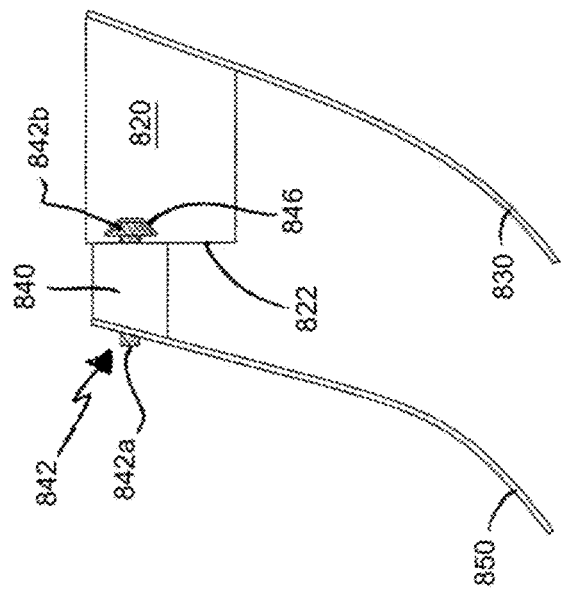
FIGS. 8A and 8B show illustrative diagrammatic views of a squeegee assembly isometric (FIG. 8A) and side views (FIG. 8B) in accordance with an aspect of the present invention including a secondary blade holder with a linear slot assembly.
Figure 8A:
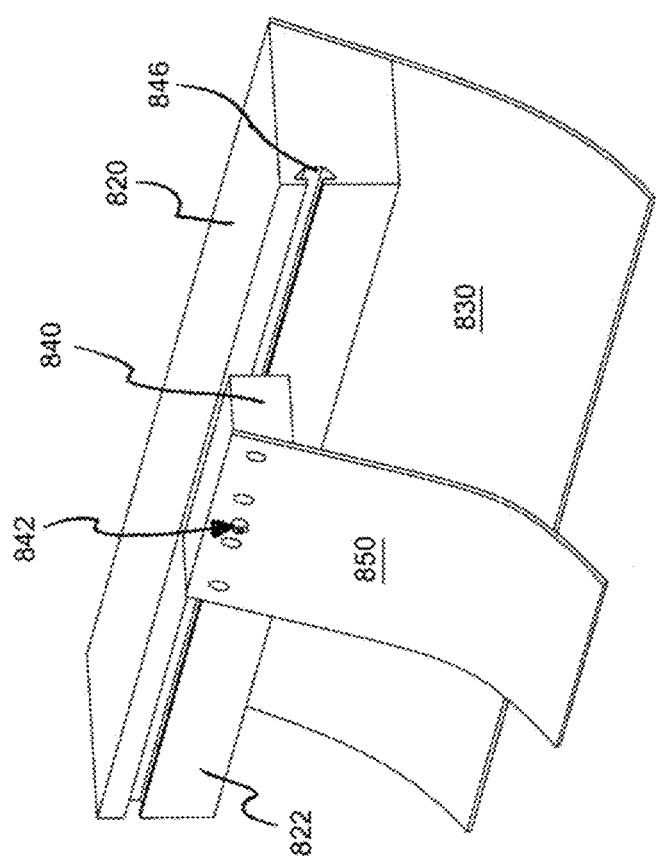

FIGS. 8A and 8B show an embodiment of the invention where the linear element along which secondary blade holder 840 is slidably mounted is a slot 846 formed within a face 822 of primary blade holder 820. Once secondary blade 850 is positioned with respect to primary blade 830, a fastening head 842a of retention element 842 can be tightened to secure a bearing element 842b within the slot 846 to prevent both rotation and lateral movement of the secondary blade holder 840. Retention element 842 can include any appropriate mounting hardware to secure the secondary blade at a desired position along the linear element.

Figure 9B:
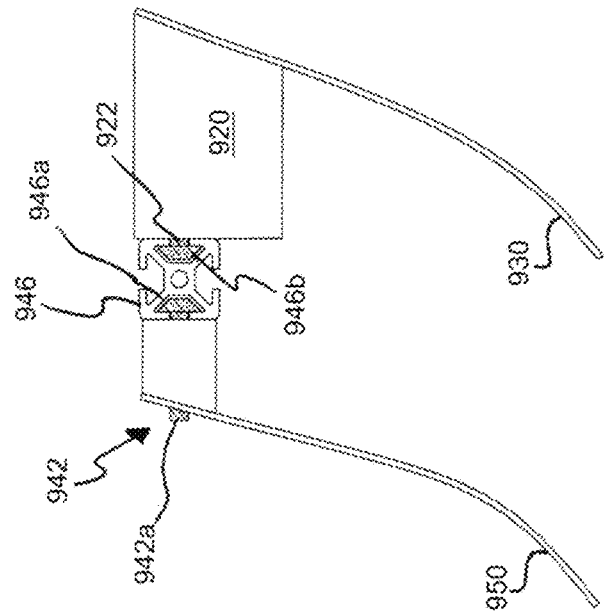
FIGS. 9A and 9B show illustrative diagrammatic views of a squeegee assembly isometric (FIG. 9A) and side views (FIG. 9B) in accordance with an aspect of the present invention including a secondary blade holder with a linear t-slot assembly.
Figure 9A:
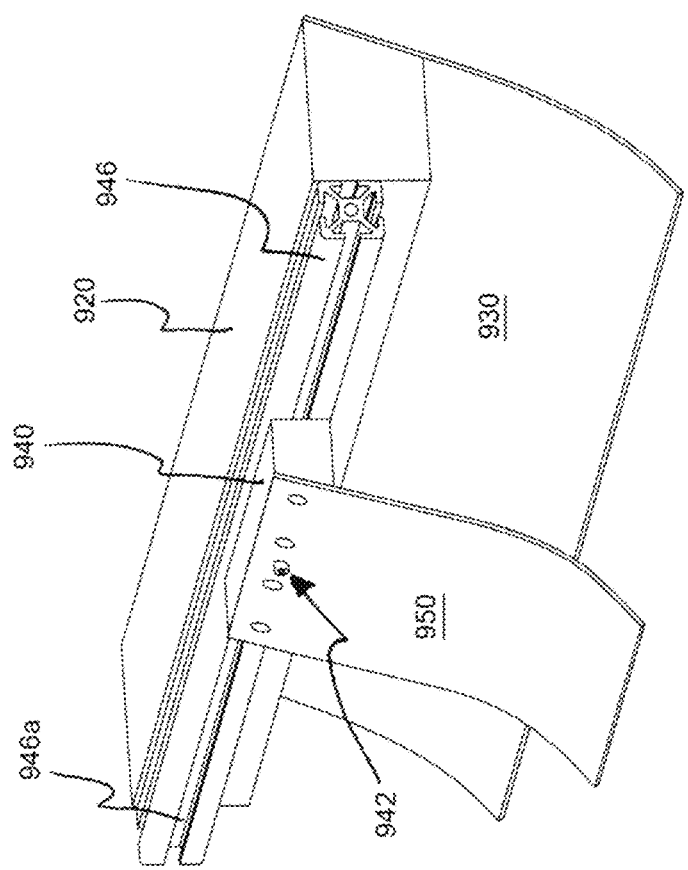

FIGS. 9A and 9B show an embodiment of the invention where the linear element along which secondary blade holder 940 is slidably mounted is an extrusion 946, such as a t-slot extrusion, having a slot 946a formed therein. The extrusion 946 is mounted to primary blade holder 920 by fastening hardware 922. Once secondary blade 950 is positioned with respect to primary blade 930, a fastening head 942a of retention element 942 can be tightened to secure a bearing element 942b within the slot 946a to prevent both rotation and lateral movement of the secondary blade holder 940. While FIGS. 9A and 9B show a secondary blade holder attached to only one slot, one or more secondary blade holders can be secured to any of the accessible slots, such as the top slot and bottom slot, of the extrusion.

In aspects of the invention that utilize slots for securing secondary blade holders, multiple secondary blade holders may be secured in the slot 1046 side-by-side similar to the embodiment of FIGS. 5A and 5B. In the situation where stepped areas overlap, such as with stencil 680, stand-offs can be used to allow secondary blades to overlap. As shown in FIGS. 10A and 10B, secondary blades holders 1040a and 1040b can use stand-offs 1043a and 1043b, respectively, to space the secondary blade holders at various distances away from the primary blade holder 1020 that allow secondary blade 1050b to overlap secondary blade 1050a without interfering with it. Retention elements 1042a/1042b can position the secondary blades with respect to the primary blade 1030.

Stencils supplied with multiple stepped areas may provide top surfaces of the stepped areas that are at different heights from one another. In these cases, the secondary blades for each stepped area can be provided with different geometries to provide optimal print characteristics for the respective apertures.

Secondary blades can also be secured to the primary blade holder using simple fasteners that can secure the secondary blade holder or secondary blade directly to the primary blade holder at a desired lateral location. The primary blade holder may have multiple mounting holes pre-formed along its length to provide various predetermined mounting locations for secondary blade holders or secondary blades.

Those skilled in the art will appreciate that numerous modifications and variations may be made to the above disclosed embodiments without departing from the spirit and scope of the present invention.

What is claimed is:

1. A squeegee assembly for use in a solder paste printing system comprising:
    a primary blade attached to the squeegee assembly with a primary blade holder;
    a linear element attached to the primary blade holder; and
    a secondary blade attached to the linear element with a secondary blade holder;
    the secondary blade holder attached to the linear element at any of a plurality of longitudinal positions with respect to the primary blade, wherein the linear element comprises a T-slot extrusion attached to the primary blade holder and the secondary blade holder is attached to the T-slot extrusion at a position along the linear element using the T-slot.

2. The squeegee assembly as claimed in claim 1 wherein the secondary blade is in a following position with respect to a first direction of movement of the primary blade.

3. The squeegee assembly as claimed in claim 1 further comprising an additional secondary blade, the additional secondary blade having an additional secondary blade holder, the additional secondary blade holder attached to the linear element at any one of a longitudinal position with respect to the primary blade.

4. The squeegee assembly as claimed in claim 3 further comprising a standoff attached to at least one of the secondary blade and the additional secondary blade to adjust a spacing relative to the primary blade.

5. The squeegee assembly as claimed in claim 4 wherein the position of the additional secondary blade overlaps the position of the secondary blade relative to the position of the primary blade.

6. A squeegee assembly for use in dispensing solder paste in apertures of a stencil used for the assembly of a printed circuit board comprising:
    a primary blade attached to the squeegee assembly with a primary blade holder;
    the primary blade having a length that extends substantially across a longitudinal length of the stencil; and
    a secondary blade attached to the primary blade holder with a secondary blade holder, wherein the secondary blade holder is attached to the primary blade holder with a linear element to adjustably position the secondary blade holder in the longitudinal direction, wherein the linear element is a slot on a face of the primary blade holder;
    the secondary blade having a length that is less than a length of the primary blade; and
    the secondary blade holder attached to the primary blade holder at any of a plurality of longitudinal positions of the stencil.

7. The squeegee assembly as claimed in claim 6 wherein the linear element further comprises a T-slot extrusion.

8. The squeegee assembly as claimed in claim 6 further comprising an additional secondary blade having a length that is less than the length of the primary blade and attached to the primary blade holder with an additional secondary blade holder at any one of a longitudinal position of the stencil.

9. The squeegee assembly as claimed in claim 8 wherein the longitudinal position of the additional secondary blade overlaps the longitudinal position of the secondary blade.

10. The squeegee assembly as claimed in claim 9 wherein the secondary blade and the additional secondary blade are in a following position with respect to a direction of movement of the primary blade.

11. The squeegee assembly as claimed in claim 6 wherein the secondary blade is in a following position with respect to a direction of movement of the primary blade.

12. A squeegee assembly for use in a solder paste printing system comprising:
    a primary blade attached to the squeegee assembly with a primary blade holder;
    a linear element attached to the primary blade holder;
    a secondary blade attached to the linear element with a secondary blade holder, the secondary blade holder attached to the linear element at any of a plurality of longitudinal positions with respect to the primary blade;
    an additional secondary blade, the additional secondary blade having an additional secondary blade holder, the additional secondary blade holder attached to the linear element at any one of a longitudinal position with respect to the primary blade; and
    a standoff attached to at least one of the secondary blade and the additional secondary blade to adjust a spacing relative to the primary blade.

13. The squeegee assembly as claimed in claim 12 wherein the linear element comprises a slot formed within the surface of the primary blade holder and the secondary blade holder is attached to the primary blade holder at a position along the linear element using the slot.

14. The squeegee assembly as claimed in claim 12 wherein the linear element comprises a T-slot extrusion attached to the primary blade holder and the secondary blade holder is attached to the T-slot extrusion at a position along the linear element using the slot.

15. The squeegee assembly as claimed in claim 12 wherein the secondary blade is in a following position with respect to a first direction of movement of the primary blade.

16. The squeegee assembly as claimed in claim 12 wherein the position of the additional secondary blade overlaps the position of the secondary blade relative to the position of the primary blade.

\* \* \* \* \*